J. P. WELCH.
PROCESS OF SMELTING ORE.
APPLICATION FILED MAR. 12, 1909.
937,031.
Patented Oct. 12, 1909.
3 SHEETS—SHEET 3.
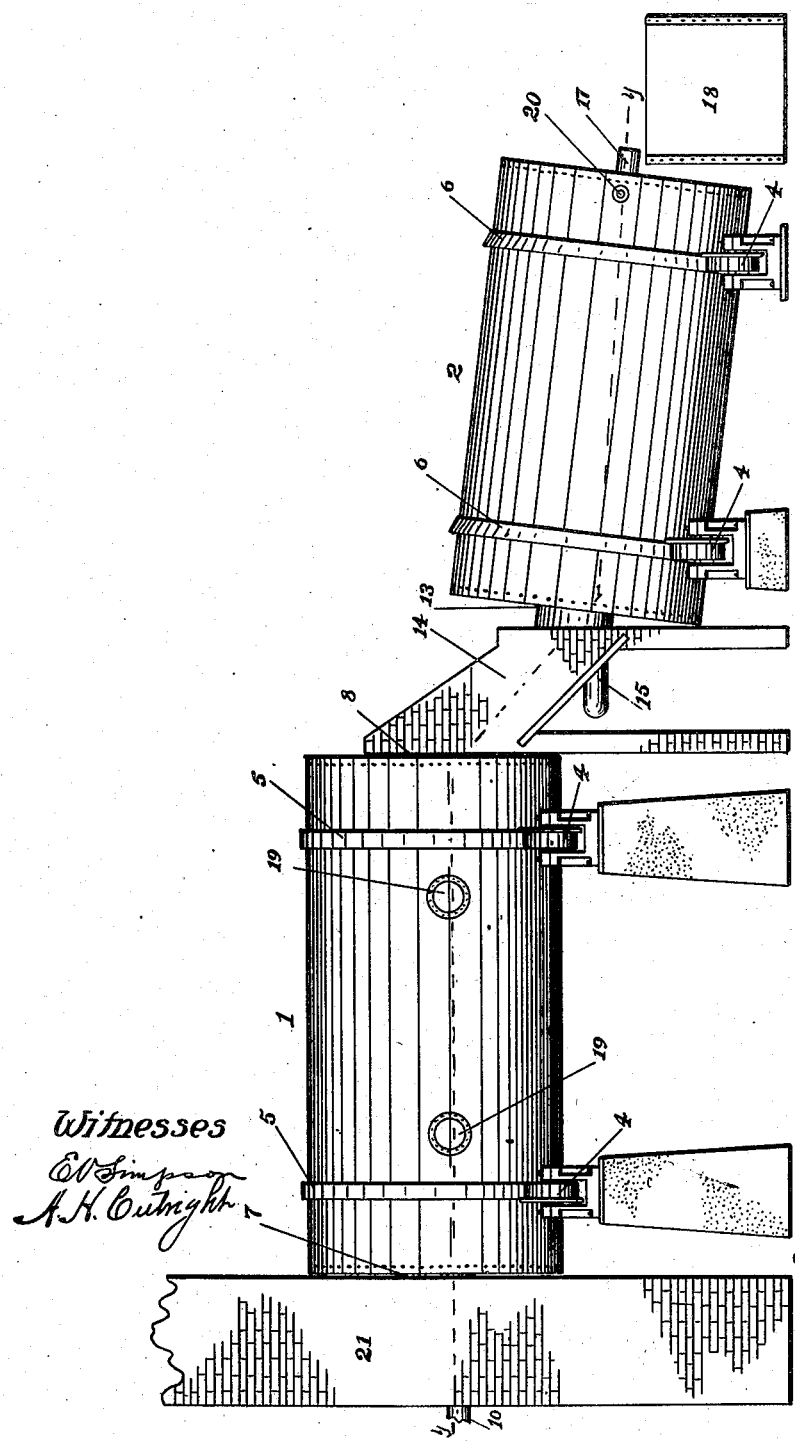

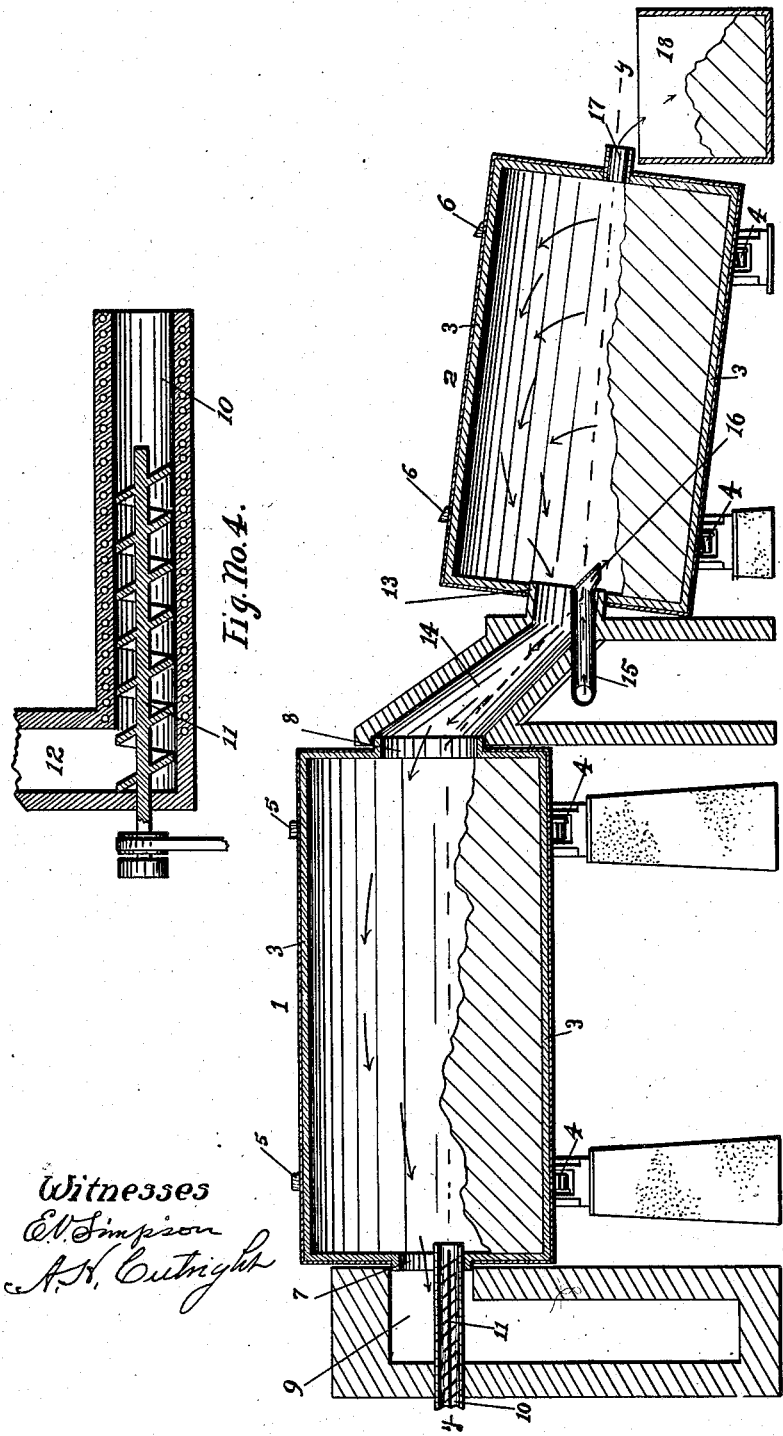

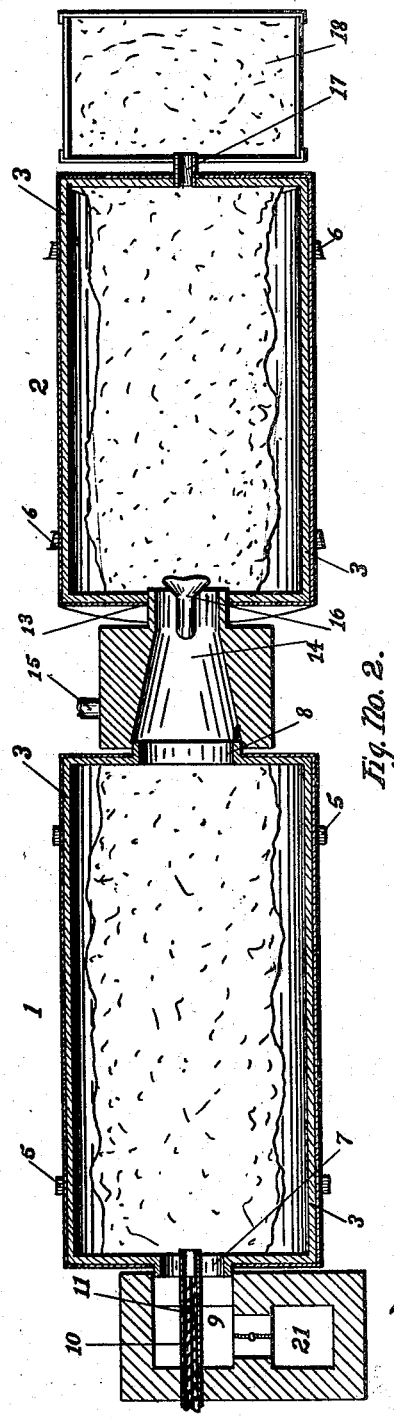
Fig. No. 2.

UNITED STATES PATENT OFFICE.

JOSEPH P. WELCH, OF SALT LAKE CITY, UTAH, ASSIGNOR OF ONE-HALF TO JAY J. SNIDER, OF SALT LAKE CITY, UTAH.

PROCESS FOR SMELTING ORE.

937,031. Specification of Letters Patent. Patented Oct. 12, 1909.

Application filed March 12, 1909. Serial No. 483,073.

*To all whom it may concern:*

Be it known that I, JOSEPH P. WELCH, a citizen of the United States, residing at Salt Lake City, in the county of Salt Lake and State of Utah, have invented certain new and useful Improvements in Processes for Smelting Ore, of which the following is a specification.

The object of my invention is to provide a process for smelting ores, with such heat and manipulation, that the metals will be smelted with less fuel than is now necessary, in less time and to produce a higher percentage matte and with smaller loss of values by volatilization. This I do by my process.

One form of a mechanical device in which the process may be advantageously used is herewith shown. The object of so illustrating with the mechanical device, is that the process may be more readily understood, it not being my intention to confine myself alone to the form of mechanical device shown. Any other form that would carry out the steps of the process may be used without detracting at all from the invention.

Figure 1 is a vertical section of two revolving furnaces showing the fuel and ore ingress. Fig. 2 is a plan in section on line y, y of Fig. 3. Fig. 3 is an outside elevation of said furnaces showing one means that may be adopted for revolving them. Fig. 4 is a vertical section in detail of one form of the feeding device.

The use of two connected furnaces enables me to smelt ores therein continuously, and to calcine the ores in one furnace with the secondary heat from the other furnace.

The furnaces 1 and 2, are constructed preferably of steel and lined with fire brick 3. They are mounted on power driven trunnioned rollers 4, and are revolved thereby with the friction of their supporting tires 5 and 6. Furnace 1 is provided with annular openings 7 and 8 in the ends thereof, the annular opening 8 being larger than the annular opening 7. This arrangement allows a discharge through said annular opening 8 and ore ingress in opening 7. Adjacent to the end of furnace 1, having the annular opening 7, is built a flue 9, with a connection to a stack 21. Constructed through flue 9, and entering furnace 1, through the annular opening 7, is a water jacketed feed pipe 10, within which is operated the power driven screw conveyer 11.

To the outer end of said water jacketed feed pipe is attached the ore chute 12. At convenient points in the circumferential wall of furnace 1 are provided manholes or cleanout openings 19. Furnace 2, has provided in the end thereof adjacent to the furnace 1, an annular opening 13, and connecting the annular opening 8 and the annular opening 13 is the ore chute and flue 14. Provided in the annular opening 13 is the fuel and air pipe 15 which has provided on the end thereof a deflector nozzle 16. The form of the deflector nozzle as illustrated and described in my application filed February 23, 1909, No. 479628, allowed May 10th, 1909, or any form of nozzle may be used that will direct the fuel and air passing therethrough in fan shaped form. Axially located in the other end of furnace 2 is a discharge pipe 17. Constructed below and adjacent to said discharge pipe 17 is the settler 18. Provided in the circumferential wall of furnace 2 and near the end having the discharge pipe 17 are the tap holes 20, for drawing off metal and cleaning out this furnace.

After the initial start, which would consist in first building sufficient fire in furnace 1, to calcine one charge of ore, properly fluxed ore is then introduced, of sufficient amount to fill said furnace to the point that it would discharge the calcined ore therein through the annular opening 8, and as directed by the ore chute 14 into furnace 2, where fuel (some form of hydrocarbon) and air would be introduced in sufficient quantities to smelt said charge of ore in furnace 2, and from then the operation would be continuous, the amount of ore supplied to the calcining furnace 1 being the amount smelted in the smelting furnace 2. The inclination of the furnace 2 permits the ore when smelted to flow out through the discharge opening 17, into the settler 18 as slag and molten mineral. The introduction of the fuel and air through the pipe 15 and as directed by the deflector 16 subjects the ore under treatment in furnace 2 to the heat necessary to smelt the ore therein. The use of the two furnaces and the direction of the heat units as indicated by the arrows in Fig. 1, enables me to obtain from the fuel the greatest amount of heat possible; and the fact that the molten mass and material in furnace 2, while being revolved, subjects the introduced ore to a bath of molten mineral as it enters the furnace, prevents the loss constantly occurring by other processes through flue dust and mineral escaping with the air currents through the stack. Any other form of mechanical device that would subject the ore as it enters the smelting furnace to an immediate immersion in molten mineral would carry out this step in my process equally as well. The introduction of the fuel and air through the pipe 15 and its deflecting nozzle 16 enables me to form a gas and fuel having the desired mixture of oxygen and carbon best adapted to the smelting of the ores under treatment. The revolution of the furnace 2, and the manner and form of introducing the fuel, subjects the constantly flowing and falling mass of molten mineral and slag, contained in said furnace, to the action of a constant impinging stream of fuel and air within said furnace, thus supplying the greatest heat to said molten mineral at the exact point where it is most desired, and introducing and supplying the oxygen within and through the molten mineral, in this manner partially bessemerizing the metal, this part of my process has previously been accomplished only in converters by the use of twyers and air blasts, thus enabling me to produce a matte carrying a greater percentage of values than has previously been possible in smelting. The revolving of the furnace 2 causes the silica in the ore, when fused by the heat, to rise to the surface, and by said revolutions, the lining of fire brick 3 will be brought in contact with the silica, a portion of which will adhere to said fire brick as said portion of said silica is drawn downward, and will form a lining or coating to said furnace, varying in thickness with the different percentages of the silica contained in the ore. And as this silicious lining is subjected to the heat of the molten mass of mineral, the silica combines with the iron oxids (formed by the previous oxidation of the iron sulfids) and forms iron silicates or slag, thus enabling me to produce the higher grade matte desired. And I have found that blister copper will be formed by this step in my process, that by its greater specific gravity, will settle in the lower end of said furnace 2, and by stopping the furnace it is drawn off through the tap holes 20. The direction of the heat units as indicated by the arrows in furnace 2 into and through furnace 1 supplies the heat necessary to continue the calcining of the ore as it passes through furnace 1.

Having thus described my process I desire to secure by Letters Patent and claim—

1. A process for smelting ores, consisting in subjecting the ore within a revolving furnace to a bath of flowing molten mineral and the heat of an impinging stream of burning fuel and oxygen.

2. A process for smelting ore, consisting in subjecting a constantly falling and flowing mass of previously calcined ore to the heat of an impinging stream of burning carbon and oxygen, while said falling and flowing mass of ore is allowed to contact with fused silica, as and for the purposes described.

3. A process for smelting ore, consisting in subjecting within a revolving furnace a constantly flowing mass of ore to the action of fused silica and to an impinging current of burning hydro-carbon and oxygen.

4. A process for smelting ore, consisting in subjecting within a revolving furnace a constantly flowing mass of ore to the action of fused silica and to an impinging current of burning hydro-carbon and oxygen, with an excess of oxygen.

5. A process for smelting ore, consisting in subjecting within a revolving furnace a constantly falling and flowing mass of molten material to the action of fused silica and to an impinging current of burning hydro-carbon and oxygen, with an excess of oxygen, as and for the purposes described.

6. A process for smelting consisting in subjecting ore within a revolving furnace to a bath of flowing molten mineral immediately upon the ore entering said furnace, and also to the action of fused silica and an impinging stream of burning hydro-carbon and oxygen, the oxygen supply being more than necessary for combustion, as and for the purposes described.

In testimony whereof I have affixed my signature in presence of two witnesses.

JOSEPH P. WELCH.

Witnesses:
 A. H. CUTRIGHT,
 J. J. SNIDER.